UNITED STATES PATENT OFFICE.

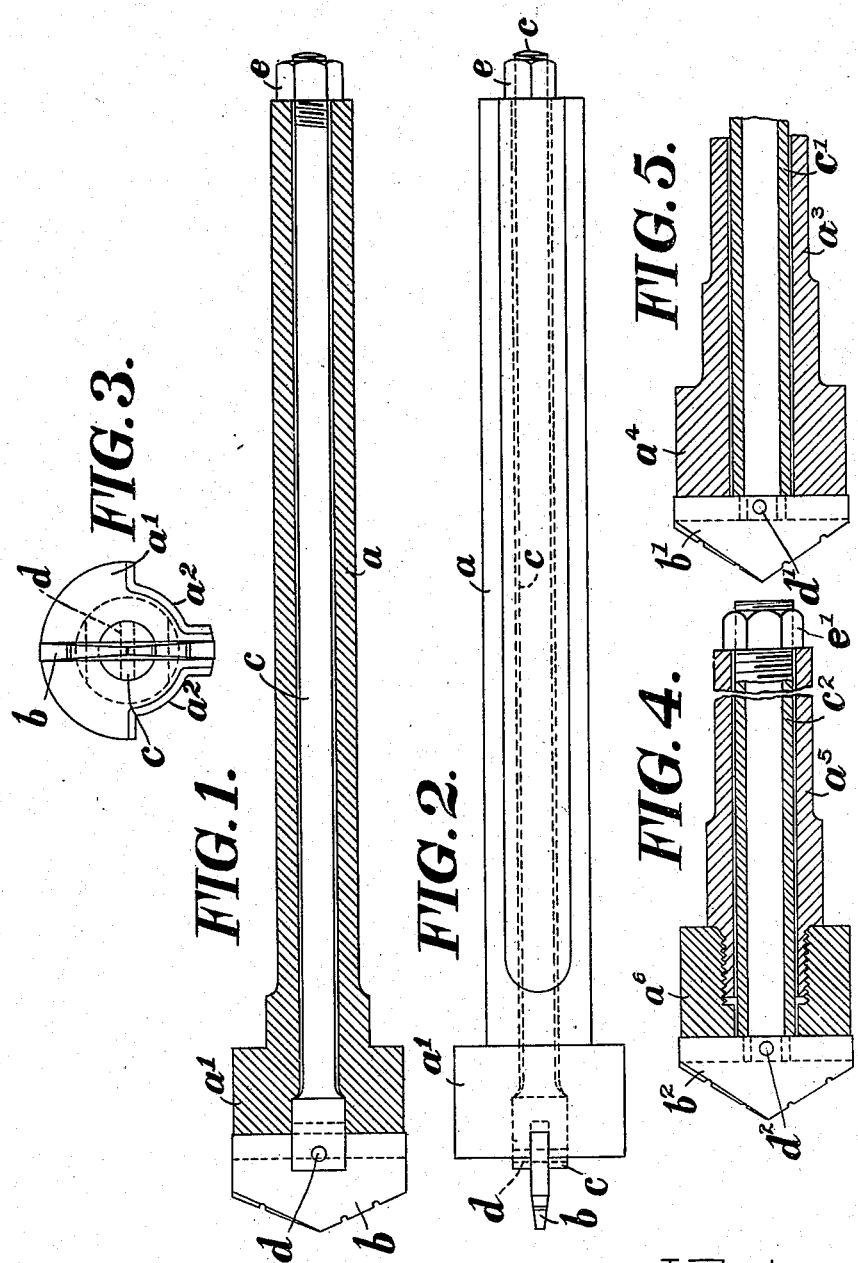

FREDERICK THOMAS, OF WIGAN, ENGLAND, ASSIGNOR OF ONE-HALF TO WALKER BROTHERS, WIGAN, LIMITED, OF WIGAN, ENGLAND.

BORING-TOOL.

No. 930,436.  Specification of Letters Patent.  Patented Aug. 10, 1909.

Application filed February 10, 1908. Serial No. 415,146.

*To all whom it may concern:*

Be it known that I, FREDERICK THOMAS, a subject of the King of Great Britain, residing in Wigan, in the county of Lancaster, in the Kingdom of England, engineer, have invented certain new and useful Improvements in Boring-Tools, for which application has been made in Great Britain, No. 3,762, dated February 15, 1907.

My invention relates to an improved tool for boring longitudinal holes through metal shafts and the like, or for removing incrustation from pipes.

In the drawings Figure 1 is a sectional elevation of my improved boring tool; Fig. 2, a plan view; Fig. 3, an end elevation of the boring head; Figs. 4 and 5, are sectional views showing slight modifications.

In Figs. 1 and 2 $a$ designates the boring tool holder having a transverse slot to receive the cutter at its front end; $b$, the bit or cutter; $c$, the bolt which is also slotted at its front end to receive the cutter; $d$, the pin by which the cutter is pivoted to the bolt, and $e$, the nut which secures the bolt $c$ and the cutter $b$ in the slot in the tool holder, and clamps the whole in place, and affords means for releasing the cutter without removing the holder from the machine. In Figs. 1, 2 and 3 the bolt is solid. On the tool holder $a$, I form a head $a^1$, and this head is just a little less in diameter, say one sixty-fourth of an inch or thereabout, than the width of the cutter $b$ so as to leave a slight clearance. To allow the borings to pass the tool head $a^1$, as the cutter bores its way into a metal shaft or the like, I cut away the tool head $a^1$ at $a^2$ on each side of the cutter $b$, so as to allow the borings to pass freely from the cutting side, to the reduced diameter of the tool holder $a$ at the back of the cutting head $a^1$.

In Fig. 5, $c^1$ represents a hollow bolt, the object of which is to allow the suds and oil to pass through the holder $a^3$ and the head $a^4$, to the cutter $b^1$, secured to the hollow bolt $c^1$ by means of the pin $d^1$. In Fig. 4 the bolt $c^2$ is also made hollow for the same purpose as that of the bolt $c^1$ in Fig. 5. In Fig. 4 the holder $a^5$ is made separate from the head $a^6$, and is connected therewith by having a threaded extension which screws into the head. A pin $d^2$ secures the cutter $b^2$ to the bolt $c^2$, on the head $a^6$, as is done in the other views.

I declare that what I claim is:—

1. An improved boring tool, consisting of a tubular tool holder with a head, a bolt extending lengthwise in the holder provided with a transverse end slot, a cutter pivotally mounted in the slot and arranged to bear against the head with its entire face exposed, and means for securing the bolt to the holder.

2. An improved boring tool, comprising a holder, a detachable head mounted on the holder, a bolt provided with a slot for receiving a cutter, a cutter pivoted in the slot, and means for holding the cutter against the head for securing the head to the holder.

In witness whereof, I have hereunto signed my name this 1st day of February 1908, in the presence of two subscribing witnesses.

FREDERICK THOMAS.

Witnesses:
G. C. DYMOND,
WM. PIERCE.